(12) United States Patent
Zha et al.

(10) Patent No.: US 10,149,148 B2
(45) Date of Patent: Dec. 4, 2018

(54) REDUCING DATA USE IN LIMITED DATA ENVIRONMENT

(71) Applicant: GOOGLE INC., Mountain View, CA (US)

(72) Inventors: Tiantian Zha, Mountain View, CA (US); Joshua Woodward, Mountain View, CA (US); Gregory Levin, Santa Cruz, CA (US); Albert Scott Bodenhamer, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/669,070

(22) Filed: Aug. 4, 2017

(65) Prior Publication Data

US 2017/0353853 A1    Dec. 7, 2017

Related U.S. Application Data

(62) Division of application No. 14/825,743, filed on Aug. 13, 2015, now Pat. No. 9,756,502.

(51) Int. Cl.
*H04W 8/22* (2009.01)
*G06F 15/16* (2006.01)
(Continued)

(52) U.S. Cl.
CPC ............ *H04W 8/22* (2013.01); *G06F 15/16* (2013.01); *G06F 17/30* (2013.01);
(Continued)

(58) Field of Classification Search
CPC ...................................................... H04W 8/22
(Continued)

(56) References Cited

U.S. PATENT DOCUMENTS 8,244,907 B2 *  8/2012  Hinton .............. G06F 17/30899
                                                             709/237
2011/0231517 A1   9/2011  Srinivasan et al.
(Continued)

OTHER PUBLICATIONS

"Mobile/Janus", MozillaWiki (https://wiki.mozilla.org/Mobile/Janus), printed Jul. 8, 2015, 11 pages.
(Continued)

*Primary Examiner* — Michael T Vu
(74) *Attorney, Agent, or Firm* — Brake Hughes Bellermann LLP

(57) ABSTRACT

A non-transitory computer-readable storage medium may include instructions stored thereon. When executed, the instructions may cause a portable computing device to prompt a user to activate a data saving feature based on a previous user having activated the data saving feature. The instructions may be configured to cause the portable computing device to accept login credentials from a first user, activate the data saving feature in response to input from the first user during a session associated with the first user, log the first user out, after logging the first user out, accept login credentials from a second user, and based on activating the data saving feature during the session associated with the first user, prompt the second user to activate the data saving feature during a session associated with the second user.

20 Claims, 11 Drawing Sheets

(51) Int. Cl.
  *H04B 1/3827*   (2015.01)
  *H04W 8/18*    (2009.01)
  *G06F 17/30*   (2006.01)
  *G06F 21/00*   (2013.01)
(52) U.S. Cl.
  CPC ........ *G06F 17/30902* (2013.01); *G06F 21/00* (2013.01); *H04B 1/3827* (2013.01); *H04W 8/18* (2013.01)
(58) Field of Classification Search
  USPC ................................................ 455/418–420
  See application file for complete search history.

(56) References Cited

U.S. PATENT DOCUMENTS

| | | | |
|---|---|---|---|
| 2014/0075280 A1* | 3/2014 | Laakmann | G06F 17/243 715/225 |
| 2015/0193802 A1* | 7/2015 | Tenison | G06Q 30/0215 705/14.17 |

OTHER PUBLICATIONS

"Service Set (802.11 network)", Wikipedia, printed Jul. 17, 2015, 3 pages.
Brinkmann, "Try Mozilla's Janus project right now! Speed up browsing, save bandwidth and more", ghacks Tech News (http://www.ghacks.net/2014/08/06/try-mozillas-janus-project-right-now-speed-browsing-save-bandwidth/), Aug. 6, 2014, updated May 2, 2015, 12 pages.
Caceres, et al. (Ed.), "Network Information API", W3C Editors draft (http://w3c.github.io/netinfo/), Nov. 17, 2014, 8 pages.
Paul, "How to limit your PC's data usage while tethering", PCWorld, Dec. 2, 2014, 5 pages.
Vail, "Understanding Google's Data Compression Proxy", Republic Help Updates (https://community.republicwireless.com/blogs/republic/2014/02107/understanding-googles-data-compression-proxy), Feb. 7, 2014, 2 pages.

* cited by examiner

REDUCING DATA USE IN LIMITED DATA ENVIRONMENT

CROSS-REFERENCE TO RELATED APPLICATION

This application is a divisional of, and claims priority to, U.S. patent application Ser. No. 14/825,743, filed on Aug. 13, 2015, entitled, "REDUCING DATA USE IN LIMITED DATA ENVIRONMENT," the disclosure of which is incorporated by reference herein in its entirety.

TECHNICAL FIELD

This description relates to data access from a portable computing device.

BACKGROUND

Users may download data onto portable computing devices via various networks, such as Institute for Electrical and Electronics Engineers (IEEE) 802.11 Wireless Fidelity ("WiFi") networks or cellular networks. At times, the data rate may be undesirably slow and/or downloading latencies may be undesirably high.

SUMMARY

According to one general aspect, a non-transitory computer-readable storage medium may include instructions stored thereon. When executed, the instructions may cause a portable computing device to activate a data saving feature in response to determining that the portable computing device is in a limited data environment. The instructions may be configured to cause the portable computing device to at least determine that the portable computing device is in the limited data environment, and based on the determining that the portable computing device is in the limited data environment, prompt a user to activate the data saving feature.

According to another general aspect, a non-transitory computer-readable storage medium may comprise instructions stored thereon for causing a portable computing device to prompt a user to download a browser extension for reducing data use in response to determining that the portable computing device is in a limited data environment. The instructions may be configured to cause the portable computing device to at least determine that the portable computing device is in the limited data environment, the determining that the portable computing device is in the limited data environment including comparing a first present latency for a first previously visited website to a first previously determined latency for the first previously visited website, comparing a second present latency for a second previously visited website to a second previously determined latency for the second previously visited website, and determining that the first present latency exceeds the first previously determined latency and the second present latency exceeds the second previously determined latency; and based on the determining that the portable computing device is in the limited data environment, prompt the user to download the browser extension, the browser extension being configured to cause the portable computing device to receive compressed data from a proxy server, and decompress the compressed data received from the proxy server.

According to another general aspect, a non-transitory computer-readable storage medium may comprise instructions stored thereon for causing a portable computing device to prompt a user to download a browser extension for reducing data use in response to determining that the portable computing device is in a limited data environment. The instructions may be configured to cause the portable computing device to at least determine that the portable computing device is accessing the Internet via a cellular connection with a base station, and based on the determining that the portable computing device is accessing the Internet via the cellular connection with the base station, prompt a user to download the browser extension. The browser extension may be configured to cause the portable computing device to receive compressed data from a proxy server, and decompress the compressed data received from the proxy server.

According to another general aspect, a non-transitory computer-readable storage medium may comprise instructions stored thereon for prompting a user to activate a data saving feature based on a previous user having activated the data saving feature. The instructions may be configured to cause a portable computing device to at least accept login credentials from a first user, activate the data saving feature in response to input from the first user during a session associated with the first user, log the first user out, after logging the first user out, accept login credentials from a second user, and based on activating the data saving feature during the session associated with the first user, prompt the second user to activate the data saving feature during a session associated with the second user.

The details of one or more implementations are set forth in the accompanying drawings and the description below. Other features will be apparent from the description and drawings, and from the claims.

DETAILED DESCRIPTION

Users of portable computing devices may access data in limited data environments. The environment may be considered a limited data environment because of a type of connection, such as a cellular or wide area network (WAN) instead of a local area network (LAN), because of an identity of a network (which may indicate that the user and portable computing device are in a congested network such as an airport, hotel, or coffee shop), or because measured data rates or latencies are slower than previously measured data rates or latencies. Some users may not know that they can, or may not know how to, activate data saving features to improve their speeds of connection. Data saving features may cause the portable computing device to receive compressed data from a proxy server, rather than receiving the data directly from web servers that host the websites the user of the portable computing device is visiting. To help users improve speeds of connection, the portable computing device may automatically prompt a user to download, install, and/or activate a data saving feature in response to determining that the portable computing device is in a limited data environment.

Figure 1:
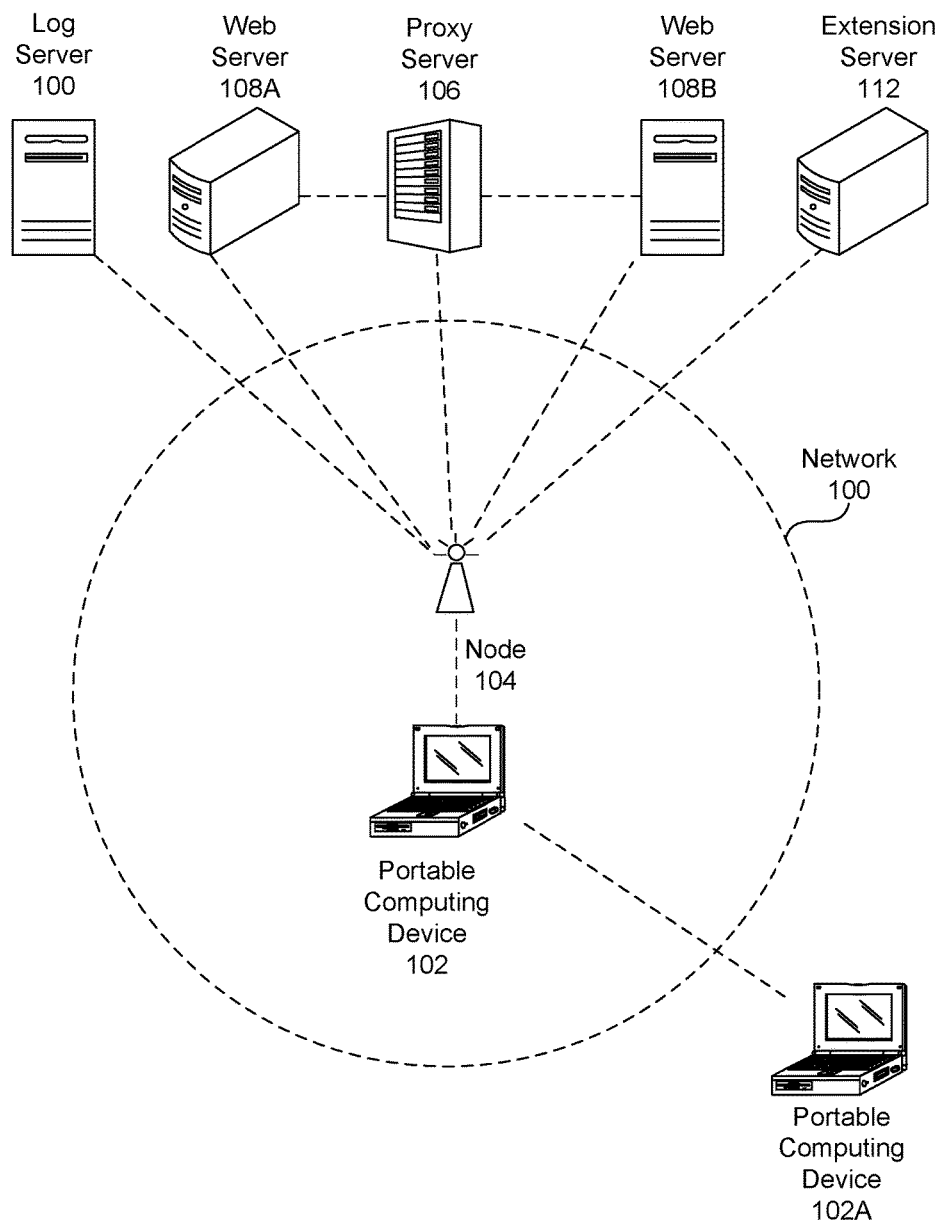
FIG. 1 is a diagram of a network according to an example embodiment.

FIG. 1 is a diagram of a network 100 according to an example embodiment. The network 100 may enable access to data, such as data available via the Internet and/or World Wide Web. The network 100 may include a wireless network, such as a cellular network including a Global System for Mobile Communications (GSM) network, a Universal Mobile Telecommunications System (UMTS) network, a Long-Term Evolution (LTE) network, an Institute for Electrical and Electronics Engineers (IEEE) 802.11 Wireless Fidelity ("WiFi") network, or a wired or guided network, according to example embodiments. The network 100 may be considered a data environment in which computing devices may access data. If data access in the network 100 is comparatively slow, such as if the network 100 is a cellular network or if data access in the network 100 is slower and/or has higher latencies than previously measured data rates and/or latencies, then the network 100 may be considered a limited data environment. The network 100 may also be considered a limited data environment if a user pays for access based on an amount of data downloaded and/or based on a time spent accessing the network 100.

A portable computing device 102 may access data, such as data available via the Internet or World Wide Web, via the network 100. Portable computing device 102 may include a laptop or notebook computer, or a tablet computer, according to example embodiments. In example embodiments, a preferred environment for the portable computing device 102 to access data may be a local area network (LAN) such as an 802.11 WiFi network, and a less preferred environment, or limited data environment, may be a wide area network (WAN) such as a cellular network.

The user of the portable computing device 102 may access the Internet via the portable computing device 102. Portable computing device 102 may access the Internet via a node 104. Node 104 may include a cellular base station, an 802.11 WiFi access point or hotspot, or any other wireless node configured to route data between the portable computing device 102 and servers on the Internet.

The portable computing device 102 may determine that the network 100 is a limited data environment. Portable computing device 102 may determine that the network 100 is a limited data environment based on determining that the connection between the portable computing device 102 and the node 104 is in a WAN and/or that the connection between the portable computing device 102 and node 104 is a cellular connection, based on identifying the node 104 as a node associated with a limited data environment (such as an airport, hotel, or coffee shop), or based on a measured speed and/or latency of accessing data via the node 104. Portable computing device 102 may access servers within the Internet, such as web servers 108A, 108B, via the node 104. While two web servers 108A, 108B are shown in FIG. 1, the portable computing device 102 may access data from any number of servers.

To reduce data consumption within a limited data environment, the portable computing device 102 may prompt the user activate a data saving feature. The data saving feature may be a feature of a browser extension. The data saving feature and/or browser extension may cause the portable computing device 102 to request and download compressed data via the node 104 from a proxy server 106 (and/or from the web servers 108A, 108B via the proxy server 106) rather than directly from the web servers 108A, 108B. The compressed data received from the proxy server 106 may include the same information as the data that would be received directly from the web servers 108A, 108B, but require fewer bits, have a smaller file size(s), and/or require less time to download than the same data received directly from the web servers 108A, 108B. After decompression, the compressed data may be the same as, and/or identical to, the data that would or could have been received directly from the web servers 108A, 108B.

Proxy server 106 may have previously downloaded data and/or files from the web servers 108A, 108B, and may compress the downloaded data for sending to the portable computing device 102. Proxy server 106 may have downloaded, stored, and compressed the data from the web servers 108A, 108B before the portable computing device 102 requested the data from the proxy server 106, or may download, store, and compress data from the web servers 108A, 108B in response to the portable computing device 102 requesting the data from the web servers 108A, 108B via the proxy server 106.

Portable computing device 102 may have preinstalled the data saving feature and may prompt the user to activate the data saving feature, or may prompt the user to download and install the data saving feature from an extension server 112. The data saving feature, which may be a browser extension, may cause the portable computing device 102 to receive the compressed data from proxy server 106, and may decompress the data for presentation to the user. The data saving feature may decompress the compressed data received from the proxy server 106.

The portable computing device 102 may send reports to a log server 110. The reports sent to the log server 110 by the portable computing device 102 may include indications of whether the user chose to activate and/or download the data saving feature in response to the prompt from the portable computing device 102. The log server 110 may store indications from many portable computing devices of whether users activated and/or downloaded the data saving feature in response to prompts. Based on the indications of whether users activated and/or downloaded the data saving feature, system administrators may determine which prompts are most effective, which types of networks and/or locations have users who are most likely to activate and/or download the data saving feature, and/or which types of portable computing devices are most likely to have users who choose to download and/or activate the data saving feature.

The reports sent by the portable computing device 102 to the log server 110 may also indicate the amount of data reduction and/or reduced latency based on using the data saving feature. The reports may indicate the reduction in data sent by downloading the compressed data from the proxy server 106 to the portable computing device 102, rather than downloading the data directly from the web servers 108A, 108B to the portable computing device 102. Based on the indications of data reduction, administrators may monitor the improvements based on the data saving feature, and may make changes to the data saving feature to increase the improvements.

Portable computing device 102 may prompt the user to activate the data saving feature a limited number of times. Portable computing device 102 may, for example, prompt the user to activate the data saving feature a maximum of two times, and if the user does not choose to activate the data saving feature in response to two different prompts, then the portable computing device 102 may stop prompting the user to activate the data saving feature. Portable computing device 102 may prompt the user to activate the data saving feature in response to determining that the portable computing device 102 is in the limited data environment (which may be the network 100), or based on a previous user of the same portable computing device 102 having activated the data saving feature, the previous user having a different account and/or login credentials than the current user.

In an example embodiment, portable computing device 102 may also prompt other portable computing devices, such as a portable computing device 102A, to activate the data saving feature based on the same user with the same account having activated the data saving feature on the portable computing device 102. For example, the user may have logged into the portable computing device 102, activated the data saving feature in response to the prompt during a first login session associated with the user's account, and thereafter logged out of the portable computing device 102. The portable computing device 102 may synchronize the user's settings across different devices associated with the user's account. The user may thereafter log into a different portable computing device 102A. Based on the user having previously activated the data saving feature during the first login session and the portable computing device 102 synchronizing the user's settings, the portable computing device 102A may activate the data saving feature during a second login session associated with the user's account without an instruction, selection, or input from the user.

Figure 2A:
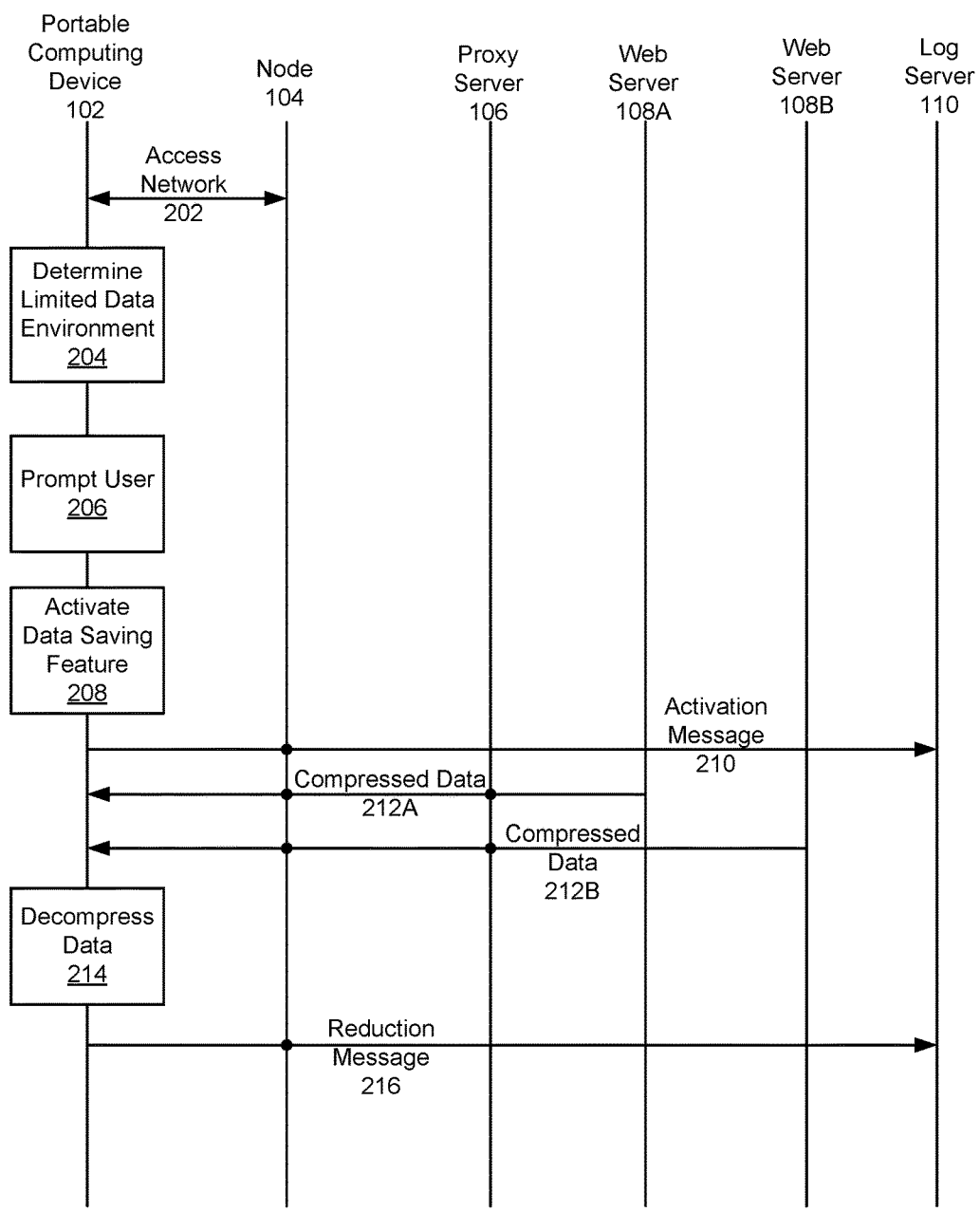
FIG. 2A is a timing diagram showing actions performed by the devices shown in FIG. 1 according to an example embodiment.

FIG. 2A is a timing diagram showing actions performed by the devices shown in FIG. 1 according to an example embodiment. As shown in FIG. 2A, the portable computing device 102 may access the network 100 (202). Portable computing device 102 may access the network (202) by communicating with the node 104. The portable computing device 102 and the node 104 may engage in a handshake protocol, by which the portable computing device 102 and node 104 send messages identifying themselves to each other, and the node 104 grants the portable computing device 102 access to the network 100.

After accessing the network (202), the portable computing device 102 may determine that the portable computing device 102 is in a limited data environment (204). Portable computing device 102 may determine that the portable computing device 102 is in the limited data environment (204) by determining that the portable computing device is accessing the Internet via a cellular connection with the node 104, which may a base station and/or WAN node, according to an example embodiment. In this example, the portable computing device 102 may determine that the node 104 is a cellular base station and/or WAN node, rather than a Wi-Fi access point or hotspot and/or LAN node, and that the network 100 is a cellular network and/or WAN, such as a Global System for Mobile communications (GSM) network, a Universal Mobile Telecommunications System (UMTS) network, or a Long-Term Evolution (LTE) network, rather than a LAN according to example embodiments.

Another example of the portable computing device 102 determining that the portable computing device 102 is in the limited data environment (204) is by determining that the portable computing device is in the limited data environment based on a data speed and/or latency. The portable computing device 102 may determine that the portable computing device 102 is in the limited data environment based on a data speed and/or latency by comparing present data speeds and/or present latencies in the network 100 to previously determined, measured, and/or stored data speeds and/or latencies.

Figure 2B:
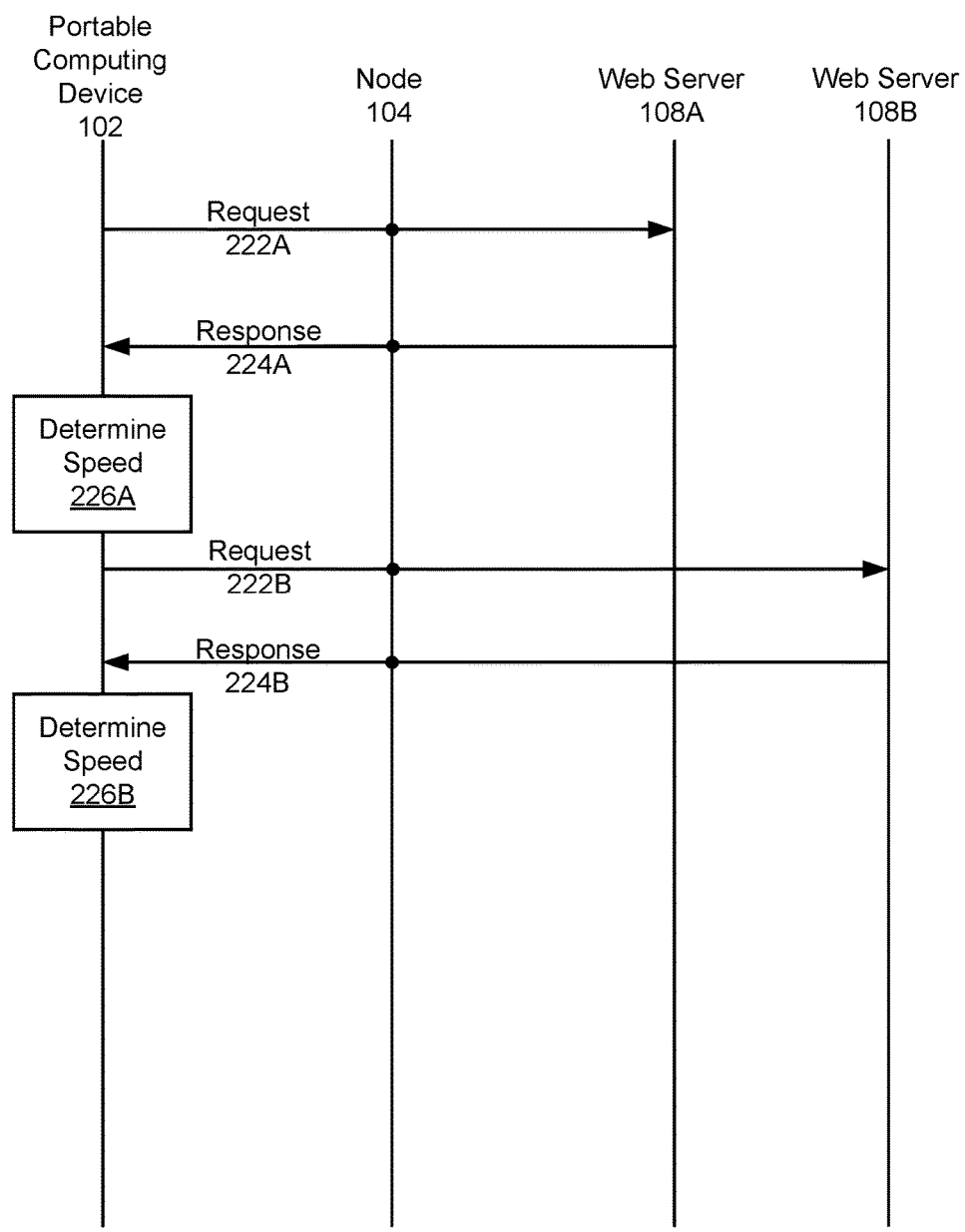
FIG. 2B is a timing diagram showing an example in which a portable computing device determines speeds of access to web servers according to an example embodiment.

FIG. 2B is a timing diagram showing an example in which the portable computing device 102 determines speeds of access to the web servers 108A, 108B according to an example embodiment. The portable computing device 102 may determine present speeds of access, such as data speeds and/or latencies, by sending requests and responses to the web servers 108A, 108B.

In the example shown in FIG. 2B, the portable computing device 102 may retrieve data from the web server 108A by sending a request 222A to the web server 108A via the node 104, and receiving a response 224A from the web server 108A via the node 104. Portable computing device 102 may determine a speed (226A) of access to the web server 108A, based on a latency and/or time difference between the request 222A and response 224A and/or an amount of data received and the time to receive the data, or other measurements of data speed between the portable computing device 102 and the web server 108A.

The portable computing device 102 may also determine the speed of access to the web server 108B. Portable computing device 102 may determine the speed of access to the web server 108B by sending a request 222B to the web server 108B via the node 104 and receiving a response 224B from the web server 108B via the node 104. Portable computing device 102 may determine a speed (226B) of access to the web server 108B, based on a latency between the request 222B and the response 224B, and/or based on an amount of data received and the time to receive the data, or other measurements of data speed between the portable computing device 102 and the web server 108B.

Returning to FIG. 2A, after determining the speeds of access to the web servers 108A, 108B, the portable computing device 102 may thereafter compare the data speed and/or latency of the data access by the portable computing device 102 to the web servers 108A, 108B to previous measurements of data speed and portable computing device 102 and the web servers 108A, 108B in different environments. The portable computing device 102 may have previously determined speeds of access, such as data speed and/or latency, to websites hosted by the web servers 108A, 108B, in a similar manner to the determinations of present speeds of access shown and described with respect to FIG. 2B, in different environments, different networks, and/or with connections to different nodes.

If the speed is significantly slower and/or the latency is significantly greater, such as the speed and/or data rate being at least a speed threshold or data rate threshold slower, and/or the latency being a threshold latency greater, than the previously stored speed and/or latency for the same web site(s) and/or the same web server 108A, 108B, then the portable computing device 102 may determine that the portable computing device 102 is in the limited data environment (204). Based on and/or in response to the portable computing device 102 determining that the portable computing device 102 is in the limited data environment 204, the portable computing device 102 may prompt the user to activate the data saving feature (206).

Figure 3A:
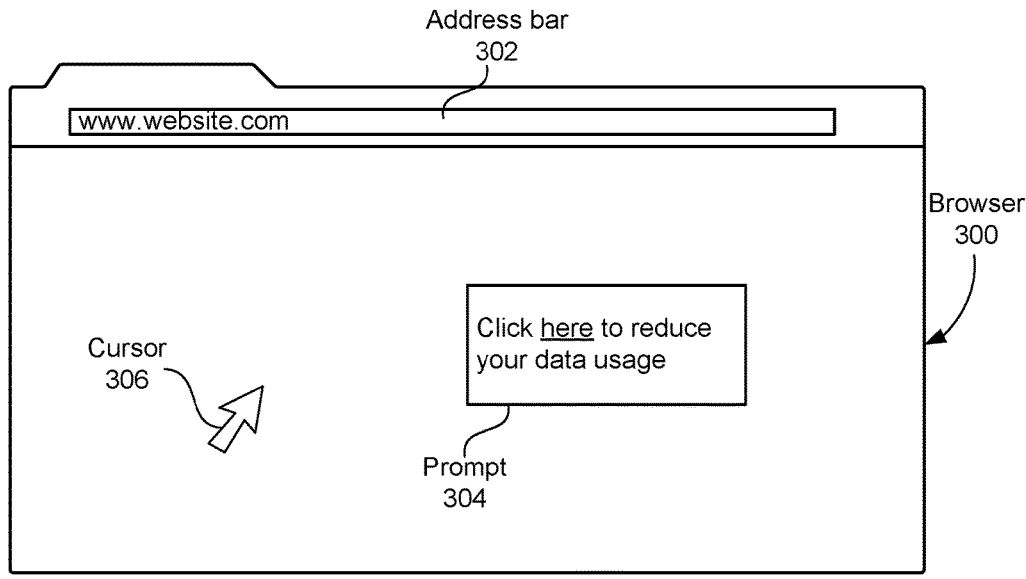
FIG. 3A shows a browser prompting a user to activate a data saving feature according to an example embodiment.

FIG. 3A shows a browser 300 prompting a user to activate a data saving feature according to an example embodiment. As shown in FIG. 3A, the user may have been accessing data at a website identified in an address bar 302 of the browser 300. The browser 300 may display a prompt 304 to the user inviting the user to activate the data saving feature. The prompt 304 may include a popup window with a hyperlink or button for the user to click on with a cursor 306 to activate the data saving feature. The prompt 304 may be generated by an operating system of the portable computing device 102.

The prompt 304 may inform the user that the data saving feature may cause some of the user's web browsing to be shared with a provider of the data saving feature, and/or inquire whether the user consents to sharing web browsing information with the provider of the data saving feature. If the user does not wish to share web browsing information with the provider of the data saving feature, then the data saving feature may not be downloaded, installed, and/or activated on the portable computing device 102.

In an example in which the data saving feature is preinstalled on the portable computing device 102, the portable computing device 102 may prompt the user to activate the data saving feature (206) by requesting the user to enable the data saving feature. In this example, clicking on the prompt 304 may enable the data saving feature.

In an example in which the data saving feature has not previously been installed and/or saved on the portable computing device 102, portable computing device 102 may prompt the user to download the data saving feature from the extension server 112. In this example, the prompt 304 may include a hyperlink taking the user to a website and/or web page where the user and/or portable computing device 102 can download the data saving feature.

Figure 2C:
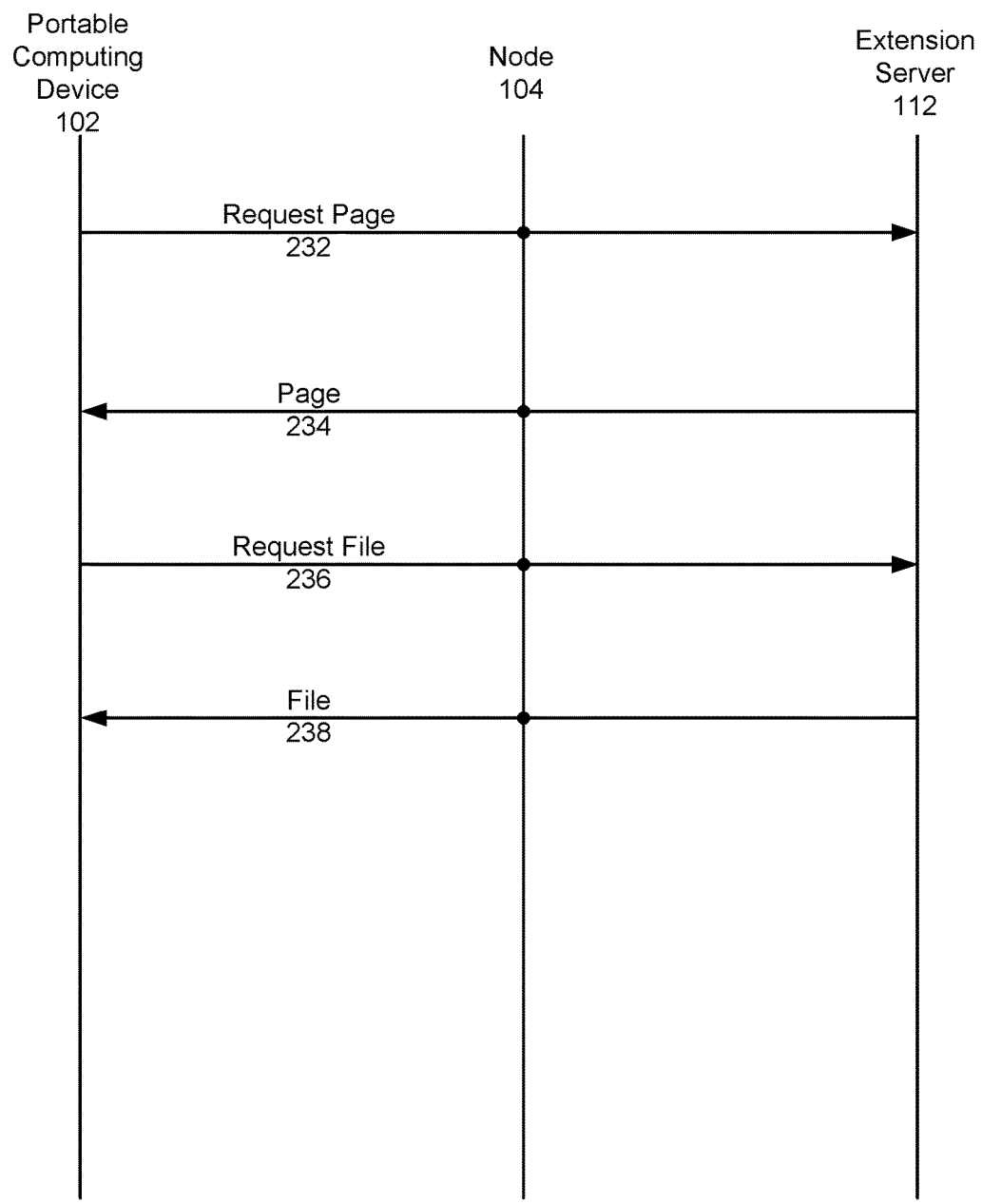
FIG. 2C is a timing diagram showing the portable computing device downloading a data saving feature from an extension server according to an example embodiment.

FIG. 2C is a timing diagram showing the portable computing device 102 downloading the data saving feature from the extension server 112 according to an example embodiment. In this example, if the user chooses to download the data saving feature in response to the prompt (206), such as by clicking on the prompt 304, the portable computing device 102 may request a page (232) from the extension server 112. Extension server 112 may respond to the request (232) by sending the page (234) to the portable computing device 102. Page (234) may include, for example, hyperlinks within a store that are associated with browser extensions or other files that the portable computing device 102 may download.

Figure 3B:
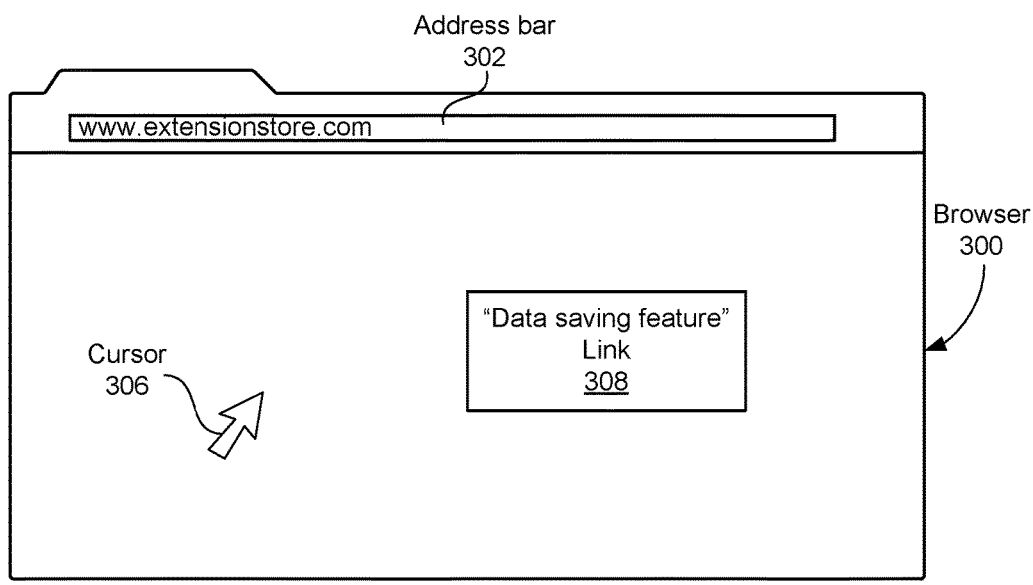
FIG. 3B shows the browser presenting a web page making the data saving feature available for download according to an example embodiment.

FIG. 3B shows the browser 300 presenting a web page making the data saving feature available for download according to an example embodiment. In this example, the browser 300 is showing the web page (234) that the portable computing device 102 received from the extension server 112. The extension server 112 may host a website and/or web page shown in the address bar 302. The website and/or web page may cause the browser 300 to display a link 308 for the user to click on with the cursor 306 to download the data saving feature and/or browser extension. The data saving feature and/or browser extension may be a Custom Widget System (CWS) widget, according to an example embodiment. The user may decide to download the data saving feature by clicking on the link 308.

Returning to FIG. 2C, the portable computing device 102 may request the file (236) which is used to install the browser extension in response to the user clicking on the link 308 associated with the browser extension. The extension server 112 may respond to the request (236) by sending the file (238), used to install and/or activate the browser extension with the data saving feature, to the portable computing device 102.

Returning to FIG. 2A, and based on user input indicating a desire to activate the data saving feature (such as by clicking on the prompt 304 and/or link 308) in response to the prompt (206), the portable computing device 102 may activate the data saving feature (208). The data saving feature may cause the portable computing device 102 to download and/or receive compressed data from the proxy server 106 rather than receiving data directly from the web servers 108A, 108B. The portable computing device 102 may show, and/or describe to the user, how to activate/enable and deactivate/disable the data saving feature.

After the portable computing device 102 has activated the data saving feature (208), the portable computing device 102 may send an activation message 210 to the log server 110. The activation message 210 may indicate whether the user chose to activate the data saving feature, and information such as an identity of the user, information about the portable computing device 102, identity and information about the network 100 such as type of network, location of the network, data speeds and/or latencies in the network, and/or number of devices in the network, as non-limiting examples. The log server 110 may respond to the activation message 210 by storing the fact of activation (or decision not to activate) in association with the information about the user, portable computing device 102, and/or network 100.

The portable computing device 102 may receive compressed data 212A, 212B from the web servers 108A, 108B via the proxy server 106 and the node 104. Portable computing device 102 may decompress the compressed data 212A, 212B (214). Decompressing the data may be a feature of the data saving feature, which may be a function of the browser extension. While most data may be received from the web servers 108A, 108B via the proxy server 106, private and/or secure data, such as data received via a Hypertext Transfer Protocol Secure (HTTPS) connection, may be received directly from the web servers 108A, 108B, and not via the proxy server 106.

Portable computing device 102 may also send a reduction message 216 to log server 110. The reduction message 216 may indicate the reduction in the amount of data downloaded and/or a reduced latency based on using the data saving feature compared to directly downloading data from the web servers 108A, 108B.

Figure 4:
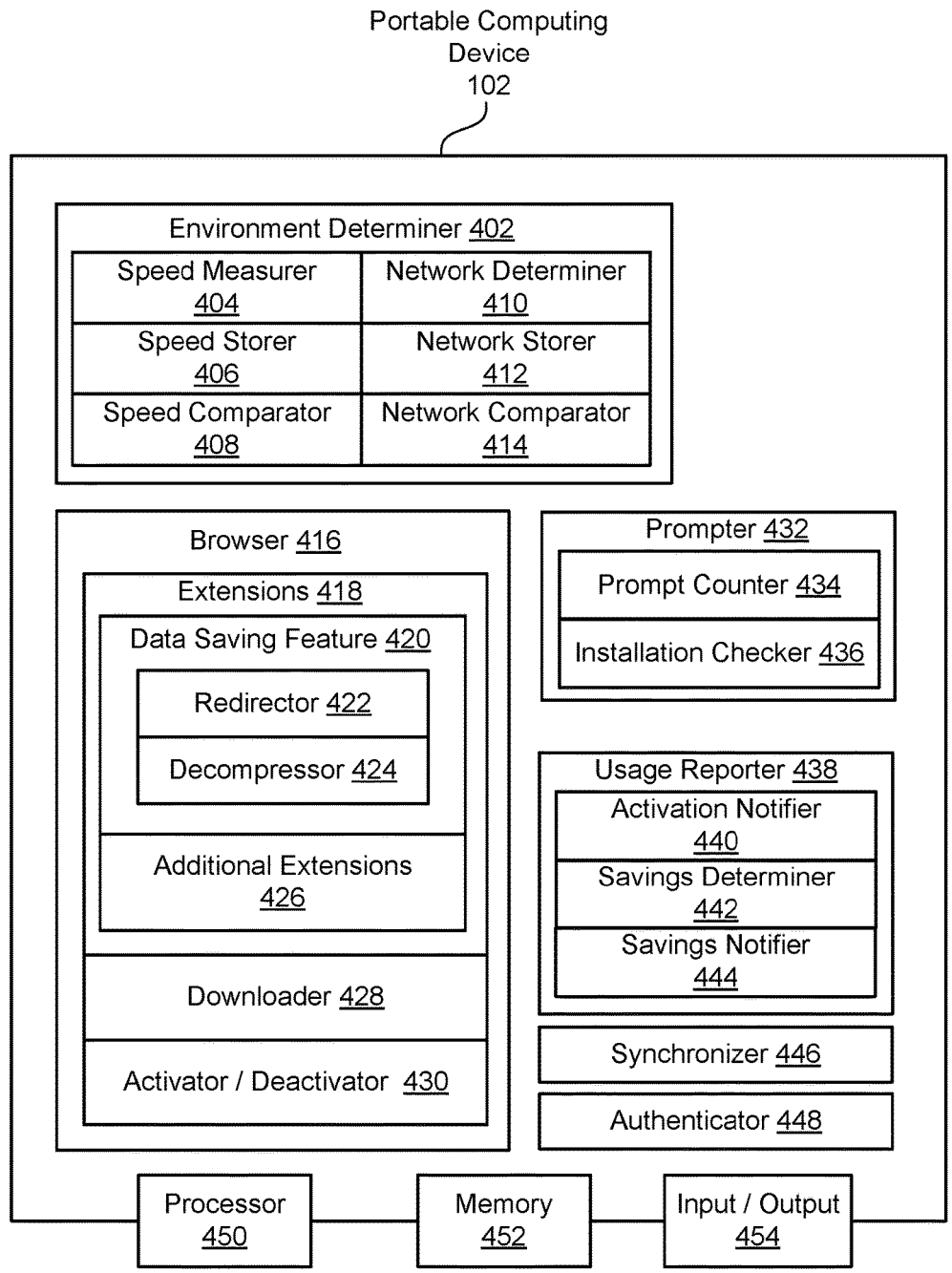
FIG. 4 is a diagram of the portable computing device according to an example embodiment.

FIG. 4 is a diagram of the portable computing device 102 according to an example embodiment. Portable computing device 102 determines whether the portable computing device 102 is in a limited data environment such as in communication with a cellular base station, or in a congested network due to contention with multiple other devices for data from a node. If the portable computing device 102 is in a limited data environment, then the portable computing device 102 may prompt the user to activate a data saving feature.

The portable computing device 102 may include an environment determiner 402. The environment determiner 402 may determine whether the portable computing device 102 is in the limited data environment.

The environment determiner 402 may include a speed measurer 404. The speed measurer 404 may measure the speed of the access to data by the portable computing device 102. The speed measurer 404 may measure, for example, a current data rate or speed of downloading data, or a latency of downloading data, from web servers 108A, 108B. The speed measurer 404 may determine and/or measure present and previous speeds of access as described above with respect to FIG. 2B, according to an example embodiment. The environment determiner 402 may also include a speed storer 406. The speed storer 406 may store download data speeds and/or latency times. The speed storer 406 may store download data speeds and/or latencies in association with particular websites and/or in association with particular networks.

The environment determiner 402 may also include a speed comparator 408. The speed comparator 408 may compare the present speed of access to websites, such as present data speeds, present data rates, and/or present latencies, to previously stored speeds of access to the same web sites, such as a previously measured data rate, previously determined data rate, previously measured data rate, and/or a previously determined latency, for a website. The comparator 408 may compare the present speed to previously measured speed for any number of websites, such as one website, two websites (associated with the two web servers 108A, 108B), three websites, or any number of websites. The speed comparator 408 may determine that the environment is a limited data environment, and/or that the network 100 is a slow network based on comparisons for all of the websites showing slower speeds, comparisons for a majority of the websites showing slower speeds, or comparisons for a supermajority of the websites showing slower speeds. If the comparison by the speed comparator 408 determines that the speed is significantly slower than a previously stored speed, then the environment determiner 402 may determine that the environment is a limited data environment, and/or that the network 100 is a slow network.

The environment determiner 402 may include a network determiner 410. The network determiner 410 may determine a type of a network in which the portable computing device 102 is receiving data. The network determiner 410 may, for example, determine a service set identifier (SSID) of the network 100. The network determiner 410 may, for example, determine whether portable computing device 102 is accessing data via a type of network such as a cellular network or WAN, which may be considered a limited data environment, based on the SSID of the network 100.

Environment determiner 402 may also include a network storer 412. The network storer 412 may store identities of previous networks. The network storer 412 may store identities of networks, including whether portable computing device 102 has previously determined that a network is a limited data environment based on previous determinations of the type and/or speed of the network. The environment determiner 402 may also include a network comparator 414. The network comparator 414 may compare a present network to stored networks to determine that portable computing device 102 is in a limited data environment based on the network determiner 410 determining that the network 100, in which the portable computing device 102 is physically located, is the same network as a network that has been previously determined to be a limited data environment based on a present identifier (such as the SSID) of the network 100. In an example embodiment, the environment determiner 402 may determine that the network 100 is a limited data environment based on the portable computing device 102 not having previously visited, and/or not having previously accessed data via, the network 100. In another example embodiment, the environment determiner 402 may determine that the network 100 is a limited data environment based on the user having to pay for incremental data use, or based on the user having to pay based on an amount of time spent accessing data within the network 100.

In an example embodiment, the environment determiner 402 may call a function to determine a maximum data rate of the network 100. The function may determine the maximum data rate by performing measurements as described above, querying the node 104 for the maximum data rate available, or based on a type of the network 100. If the maximum data rate determined by calling the function is less than a threshold and/or predetermined data rate, then the environment determiner 402 may determine that the portable computing device 102 is in a limited data environment.

Portable computing device 102 may include a browser 416. The browser 416 may facilitate the user of the portable computing device 102 visiting websites and may present information based on pages downloaded from websites, such as websites hosted by web servers 108A, 108B. Extensions 418 may extend functionality of the browser 416.

The extensions 418 may include a data saving feature 420. The data saving feature 420 may have the features described above with respect to a data saving feature. The data saving feature 420 may have been preinstalled on the portable computing device 102. The data saving feature 420 may reduce the data required to download a page. The data saving feature 420 may include a redirector 422. The redirector 422 may redirect requests for webpages and websites from the web servers 108A, 108B associated with websites to the proxy server 106. Requests redirected to the proxy server 106 may include the website as parameters in the requests to the proxy server 106. The data saving feature 420 may also include a decompressor 424. The decompressor 424 may decompress data received from the proxy server 106. The decompressor 424 may decompress the compressed data received from the proxy server 106 according to a protocol that was determined, and/or agreed upon between the portable computing device 102 and the proxy server 106, before the portable computing device 102 received the compressed data from the proxy server 106. The extensions 418 may also include additional extensions 426 which extend the functionality of the browser 416.

The browser 416 may include a downloader 428. The downloader 428 may download, for example, files from web sites, such as webpages and files. The files may include the file to install and activate the data saving feature 420 in the browser 416. The browser 416 may also include an activator/deactivator 430. The activator/deactivator 430 may enable the user to activate and deactivate extensions of the browser 416, such as the data saving feature 420.

Portable computing device 102 may include a prompter 432. The prompter 432 may prompt the user to download, install, and/or activate the data saving feature based on, and/or in response to, the environment determiner 402 determining that the portable computing device 102 is in a limited data environment. The prompter 432 may prompt the user to download, install, and/or activate the data saving feature based on, and/or in response to, a previous user of the portable computing device 102 having activated the data saving feature 420.

The prompter 432 may present a prompt, such as a popup window including the prompt 304 shown in FIG. 3A, to the user to activate and/or download the data saving feature 420. The prompter 432 may include a hyperlink with a specified Uniform Resource Locator (URL) directing the user to a store in which the user of the portable computing device 102 may download the data saving feature 420. The user may download the data saving feature 420 to the portable computing device 102 as an extension 418 of the browser 416. In an example in which the data saving feature 420 has been preinstalled and/or has already been installed on the portable computing device 102, the prompter 432 may prompt the user to activate the data saving feature 420 on the portable computing device 102.

The prompter 432 may include a prompt counter 434. The prompt counter 434 may count a number of times that the prompter 432 has prompted the user to download, install, and/or activate the data saving feature 420. If the prompter 432 has prompted the user to download, install, and/or activate the data saving feature 420 at least, or greater than, a predetermined number of times, and the user has not chosen to download, install, and/or activate the data saving feature 420 in response to any of the prompts, then the prompter 432 may stop prompting the user to download, install, and/or activate the data saving feature 420. For example, the prompter 432 may prompt the user to download, install, and/or activate the data saving feature 420 twice, and if the user does not download, install, and/or activate the data saving feature 420 in response to either of the two prompts, then the prompter 432 may not prompt the user to download, install, and/or activate the data saving feature 420 any more times.

The prompter 432 may also include an installation checker 436. The installation checker 436 may check to determine whether the data saving feature 420 has already been downloaded, installed, and/or activated on the portable computing device 102. If the data saving feature 420 has already been downloaded, installed, and/or activated on the portable computing device 102, then the prompter 432 may not prompt the user to download, install, and/or activate the data saving feature 420 on the portable computing device 102.

The portable computing device 102 may include a usage reporter 438. The usage reporter 438 may report to the log server 110 whether the user of the portable computing device 102, and users or other portable computing devices, have downloaded, installed, and/or activated the data saving feature 420 in response to the prompt, and/or the savings in data and/or reduction in latency based on use of the data savings feature 420.

The usage reporter 438 may include an activation notifier 440. The activation notifier 440 may send the activation message 210 to the log server 110 indicating whether the user has downloaded, installed, and/or activated the data saving feature 420 in response to the prompt. The activation message 210 may include information identifying the portable computing device 102, the user and/or account that is logged into the portable computing device 102, information about the environment and/or network that caused the prompt to download, install, and/or activate the data saving feature 420, such as the type of network (cellular, wide area network, local area network) and/or statistics (data rate, latency), and/or a location of the portable computing device 102, as non-limiting examples.

The usage reporter 438 may also include a savings determiner 442. The savings determiner 442 may determine the savings attributable to the portable computing device 102 using the data saving feature 420 and/or receiving data from the web servers 108A, 108B via the proxy server 106. The savings determiner 442 may, for example, determine a reduction in the downloaded data and/or a reduction in the latency required to download the data from the web servers 108A, 108B attributable to using the data savings feature 420. The savings determiner 442 may determine the reduction by comparing current data amounts and/or current latencies using the data saving feature 420 to previously measured data amounts and/or latencies not using the data saving feature, or by comparing the received, compressed file sizes and/or amounts of data to decompressed file sizes and/or amounts of data.

The usage reporter 438 may also include a savings notifier 444. The savings notifier 444 may notify the log server 110 of the savings attributable to the portable computing device 102 using the data saving feature 420 and/or receiving data from the web servers 108A, 108B via the proxy server 106. The savings notifier 444 may send the reduction message 216 to the log server 110, the reduction message 216 including the savings attributable to the portable computing device 102 using the data saving feature 420 and/or receiving data from the web servers 108A, 108B via the proxy server 106. The reduction message 216 may indicate the measured reduction in data use, and/or the measured reduction in latency, by activating and/or using the data saving feature 420.

The portable computer device 102 may include a synchronizer 446. The synchronizer 446 may synchronize settings across devices associated with the user's account. For example, if the user of the portable computing device 102 has activated the data saving feature 420, then the synchronizer 446 may activate the data saving feature 420 on other devices, such as the portable computing device 102A, associated with the user's account. The synchronizer 446, which may be common to multiple portable computing devices 102, 102A, may activate the data saving feature 420 in the portable computing device 102A, and/or multiple computing devices associated with an account associated with the user, in response to the user logging into the portable computing device 102A based on the user having previously activating the data saving feature 420 in the portable computing device 102.

The portable computing device 102 may include an authenticator 448. The authenticator 448 may authenticate users, and/or accounts associated with users, to the portable computing device 102. The authenticator 448 may receive login credentials, such as a username and password, compare the login credentials to previously stored login credentials, and if the received login credentials match the previously stored login credentials, authenticate and/or log the user into the portable computing device 102 to begin a session with the user. The session may end when the user logs out. Upon authenticating and/or logging the user into the portable computing device 102, the authenticator 448 and/or portable computing device may, during a session with the user, restore settings associated with the user, such as bookmarks on the browser 416, previously visited websites, and/or activated extensions 418 such as the data saving feature 420. If the user logs into another portable computing device 102A, the portable computing device 102A, may restore the user's settings, such as use and/or activation of the data saving feature 420, during the user's session on the portable computing device 102A.

The portable computing device 102 may include at least one processor 450. The at least one processor 450 may include one or more processors capable of executing instructions, such as instructions for the portable computing device 102 to perform any of the methods, functions, and/or processes described herein.

The portable computing device 102 may include at least one memory device 452. The at least one memory device 452 may include at least one non-transitory computer-readable storage medium, and may store executable instructions and data. The executable instructions stored by the at least one memory device 452 may include instructions that, when executed by the at least one processor 450, are configured to cause the portable computing device 102 to perform any combination of the methods, functions, and/or processes described herein. The data stored by the at least one memory device 452 may include data used by the portable computing device 102 to perform, and/or generated by the portable computing device 102 when performing, any of the methods, functions, and/or processes described herein.

The portable computing device 102 may include input/output modules 454. The input/output modules 454 may receive input from the user and/or other computing devices, and may provide output to the user and/or other computing devices. The input/output modules 454 may include input devices such as a keyboard, a touchscreen, data input nodes such as a Universal Serial Bus (USB) port and/or wireless interface, location sensors such as GPS monitors, a tilt sensor, and/or a microphone, and may include output devices such as a display, speaker (which may output an alarm sound), vibration device, and/or data input nodes such as the USB port, and may include one or more wireless interfaces such as antennas for sending and receiving signals with base stations included in a Global System for Mobile Communications (GSM) network, a Universal Mobile Telecommunications System (UMTS) network, or a Long-Term Evolution (LTE) network, satellites providing data access to the portable computing device 102, and/or access points in an Institute for Electrical and Electronics Engineers (IEEE) 802.11 Wireless Fidelity ("WiFi") network.

Figure 5:
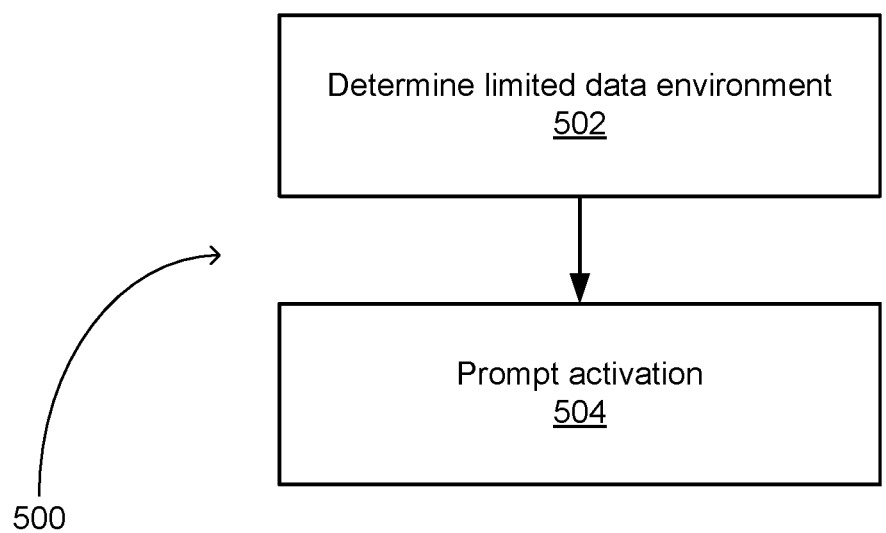
FIG. 5 is a flowchart showing a method of activating a data saving feature in response to determining that the portable computing device is in a limited data environment according to an example embodiment.

FIG. 5 is a flowchart showing a method 500 of activating a data saving feature in response to determining that the portable computing device 102 is in a limited data environment according to an example embodiment. The method 500 may include determining that the portable computing device 102 is in the limited data environment (502). The method 500 may also include, based on the determining that the portable computing device 102 is in the limited data environment, prompting a user to activate the data saving feature 420 (504).

In an example implementation, the limited data environment may include a wireless network.

In an example implementation, the determining that the portable computing device 102 is in the limited data environment (502) may include determining that the portable computing device 102 is receiving data via a cellular base station.

In an example implementation, determining that the portable computing device 102 is in the limited data environment (502) may include determining that the portable computing device 102 is receiving data via a Global System for Mobile Communications (GSM).

In an example implementation, determining that the portable computing device 102 is in the limited data environment (502) may include determining that the portable computing device 102 is receiving data via a Universal Mobile Telecommunications System (UMTS).

In an example implementation, determining that the portable computing device 102 is in the limited data environment (502) may include determining that the portable computing device 102 is receiving data via a Long-Term Evolution (LTE) network.

In an example implementation, determining that the portable computing device 102 is in the limited data environment (502) may include determining that a current data rate is lower than at least one previously measured data rate.

In an example implementation, determining that the portable computing device 102 is in the limited data environment (502) may include comparing a present data rate for a previously visited website to a previously determined data rate for the previously visited website.

In an example implementation, determining that the portable computing device 102 is in the limited data environment (502) may include comparing a present latency for a previously visited website to a previously determined latency for the previously visited website.

In an example implementation, determining that the portable computing device 102 is in the limited data environment (502) may include comparing a first present latency for a first previously visited website to a first previously determined latency for the first previously visited website, comparing a second present latency for a second previously visited website to a second previously determined latency for the second previously visited website, and determining that the first present latency exceeds the first previously determined latency and the second present latency exceeds the second previously determined latency.

In an example implementation, determining that the portable computing device 102 is in the limited data environment (502) may include determining that the portable computing device 102 is in the limited data environment based on a service set identifier (SSID) associated with a network 100 via which the portable computing device 102 is receiving data.

In an example implementation, the SSID associated with the network via which the portable computing device is receiving data may have previously been stored as a slow network.

In an example implementation, the SSID associated with the network via which the portable computing device is receiving data may not have previously been visited by the portable computing device 102.

In an example implementation, determining that the portable computing device 102 is in the limited data environment (502) may include determining that the user will pay for additional incremental data use.

In an example implementation, determining that the portable computing device 102 is in the limited data environment (502) may include determining that the user will pay based on an amount of time spent accessing a network associated with the limited data environment.

In an example implementation, the prompting the user to activate the data saving feature (504) may include prompting the user to download a browser extension 418. The browser extension 418 may be configured to cause the portable computing device 102 to receive compressed data 212A, 212B from a proxy server 106, and decompress (214) the compressed data 212A, 212B received from the proxy server 106.

In an example implementation, the method 500 may further include determining that the data saving feature 420 has not already been installed on the portable computing device 102. The prompting the user to activate the data saving feature (504) may be performed based on the determination that the portable computing device is in the limited data environment and the determination that the data saving feature 420 has not already been installed on the portable computing device 102.

According to an example implementation, the prompting the user to activate the data saving feature 420 (504) may include prompting the user to activate a browser extension 418. The browser extension 418 may be configured to cause the portable computing device 102 to receive compressed data 212A, 212B from a proxy server 106, and decompress (214) the compressed data 212A, 212B received from the proxy server 106.

According to an example implementation, the prompting the user to activate the data saving feature 420 (504) may include prompting the user to download a browser extension 418 at a specified Uniform Resource Locator (URL) address.

According to an example implementation, the prompting the user to activate the data saving feature 420 (504) may be performed a limited number of times, based on the determining that the portable computing device 102 is in the limited data environment (502).

According to an example implementation, the method 500 may further include the portable computing device 102 sending a message 210 to a log server 110 indicating that the user activated the data saving feature 420.

According to an example implementation, the method 500 may further include the portable computing device 102 sending at least one message 216 to a log server 110 indicating a measured reduction in data use by activating the data saving feature 420.

According to an example implementation, the method 500 may further include the portable computing device 102 sending at least one message 216 to a log server 110 indicating a measured reduction in latency by activating the data saving feature 420.

According to an example implementation, the portable computing device 102 may include at least one of a laptop computer and a tablet computer.

According to an example implementation, the method 500 may further include the portable computing device 102 activate the data saving feature 420 across multiple computing devices 102, 102A associated with an account associated with the user, in response to the user activating the data saving feature 420.

Figure 6:
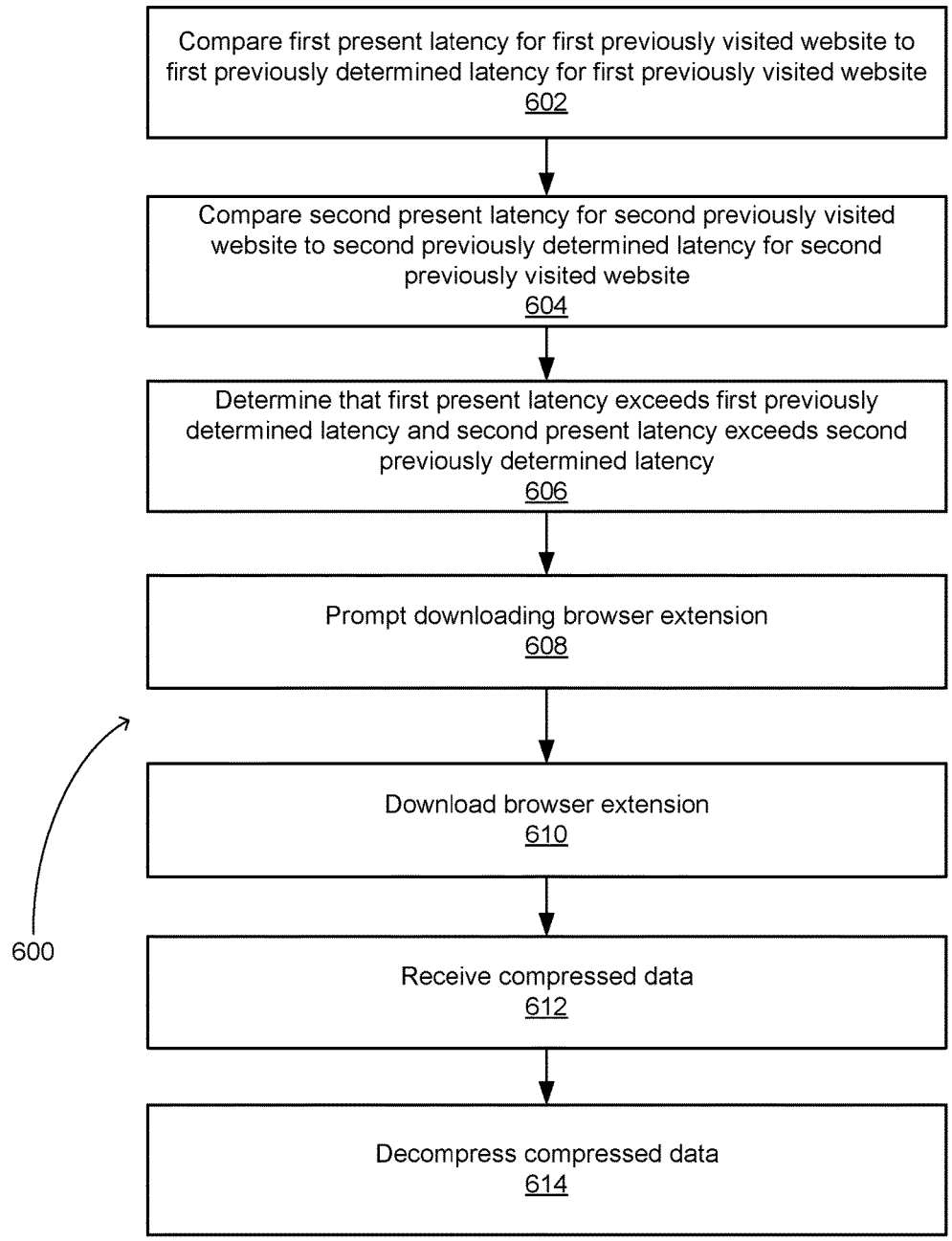
FIG. 6 is a flowchart showing a method of prompting a user to download a browser extension for reducing data use in response to determining that the portable computing device is in a limited data environment according to an example embodiment.

FIG. 6 is a flowchart showing a method 600 of prompting a user to download a browser extension 418 for reducing data use in response to determining that the portable computing device 102 is in a limited data environment according to an example embodiment. The method 600 may include determining that the portable computing device 102 is in the limited data environment. The determining that the portable computing device 102 is in the limited data environment may include comparing a first present latency for a first previously visited website to a first previously determined latency for the first previously visited website (602), comparing a second present latency for a second previously visited website to a second previously determined latency for the second previously visited website (604), and determining that the first present latency exceeds the first previously determined latency and the second present latency exceeds the second previously determined latency (606). The method 600 may also include, based on the determining that the portable computing device 102 is in the limited data environment, prompting the user to download the browser extension 418 (608). Once downloaded (610), the browser extension 418 may be configured to cause the portable computing device 102 to receive compressed data 212A, 212B from a proxy server 106 (612), and decompress (614) the compressed data 212A, 212B received from the proxy server 106 (614).

Figure 7:
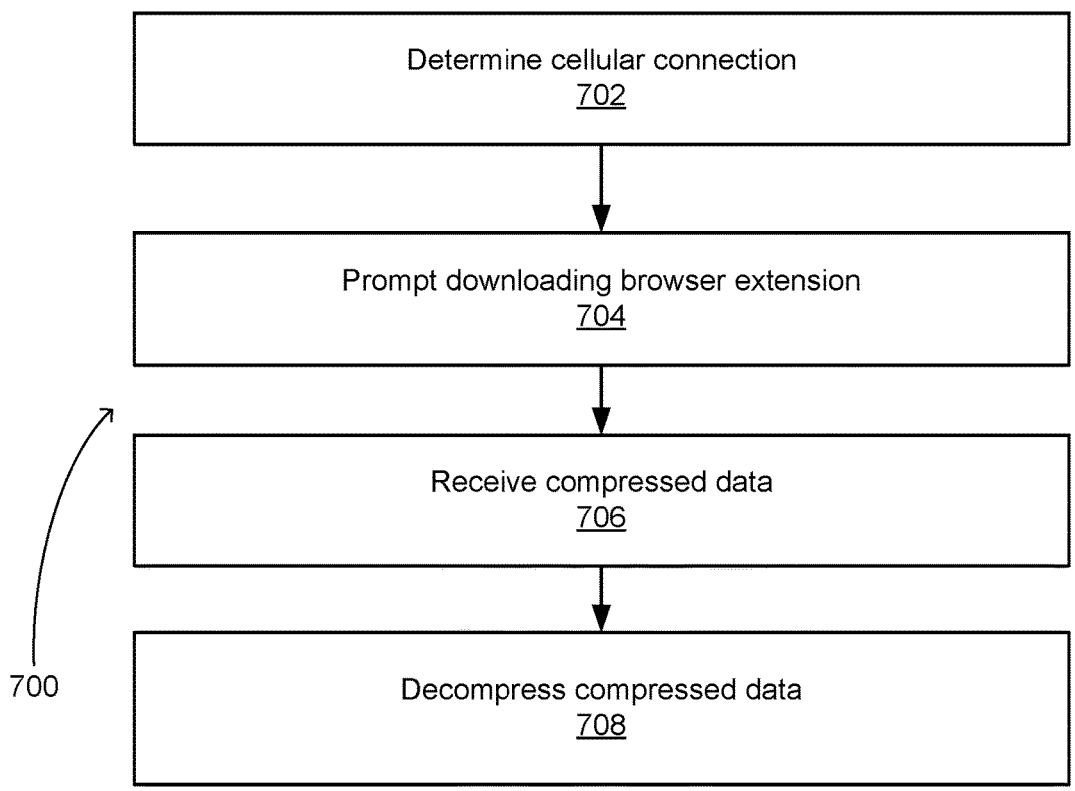
FIG. 7 is a flowchart showing a method of prompting a user to download a browser extension for reducing data use in response to determining that the portable computing device is in a limited data environment according to another example embodiment.

FIG. 7 is a flowchart showing a method 700 of prompting a user to download a browser extension 418 for reducing data use in response to determining that the portable computing device 102 is in a limited data environment according to another example embodiment. The method 700 may include determining that the portable computing device 102 is accessing the Internet via a cellular connection with a base station 104 (702). The method 700 may also include, based on the determining that the portable computing device 102 is accessing the Internet via the cellular connection with the base station 104, prompting a user to download the browser extension 418 (704). Once downloaded, the browser extension 418 may be configured to cause the portable computing device 102 to receive compressed data 212A, 212B from a proxy server 106 (706), and decompress 214 the compressed data 212A, 212B received from the proxy server 106 (708).

Figure 8:
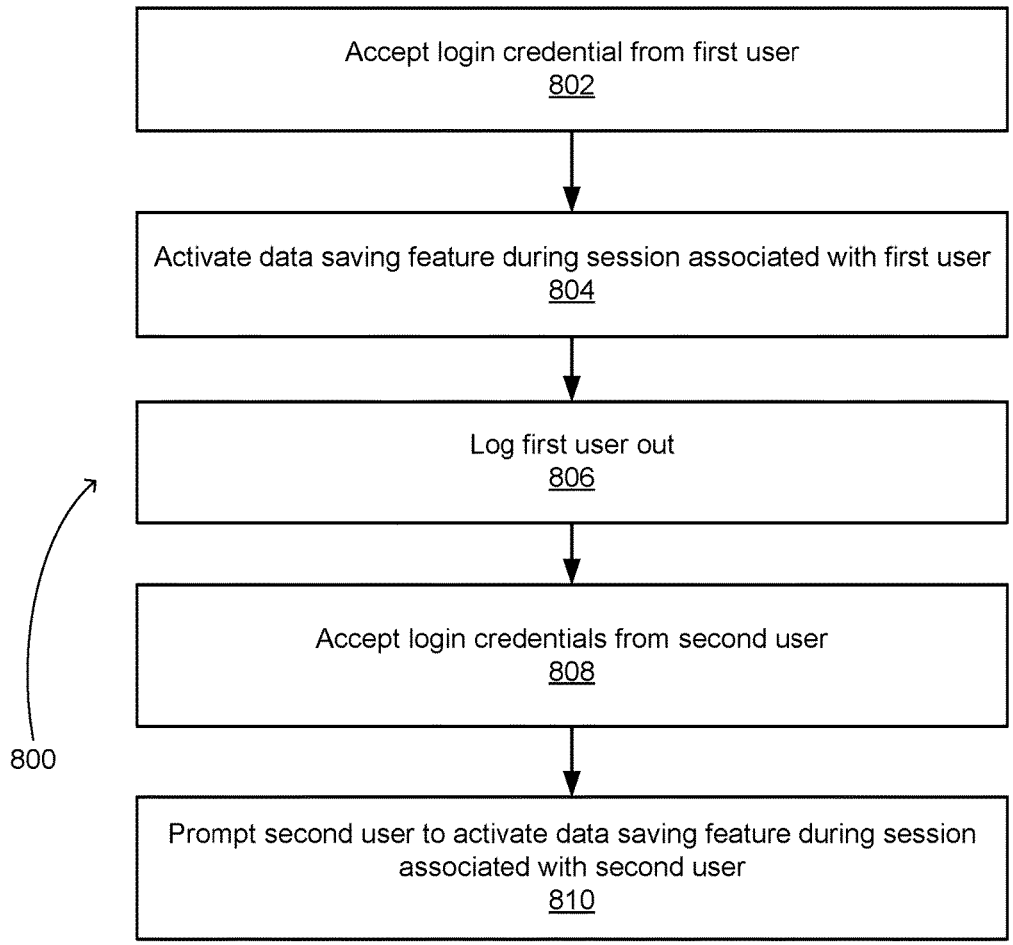
FIG. 8 is a flowchart showing a method of prompting a user to activate a data saving feature based on a previous user having activated the data saving feature according to an example embodiment.

FIG. 8 is a flowchart showing a method 800 of prompting a user to activate a data saving feature 420 based on a previous user having activated the data saving feature 420 according to an example embodiment. The method 800 may include the portable computing device 102 accepting login credentials from a first user (802). The method 800 may also include activating the data saving feature 420 in response to input from the first user during a session associated with the first user (804). The method 800 may also include logging the first user out (806). The method 800 may also include, after logging the first user out (806), accepting login credentials from a second user (808). The method 800 may also include, based on activating the data saving feature 420 during the session associated with the first user (804), prompting the second user to activate the data saving feature 420 during a session associated with the second user (810).

Figure 9:
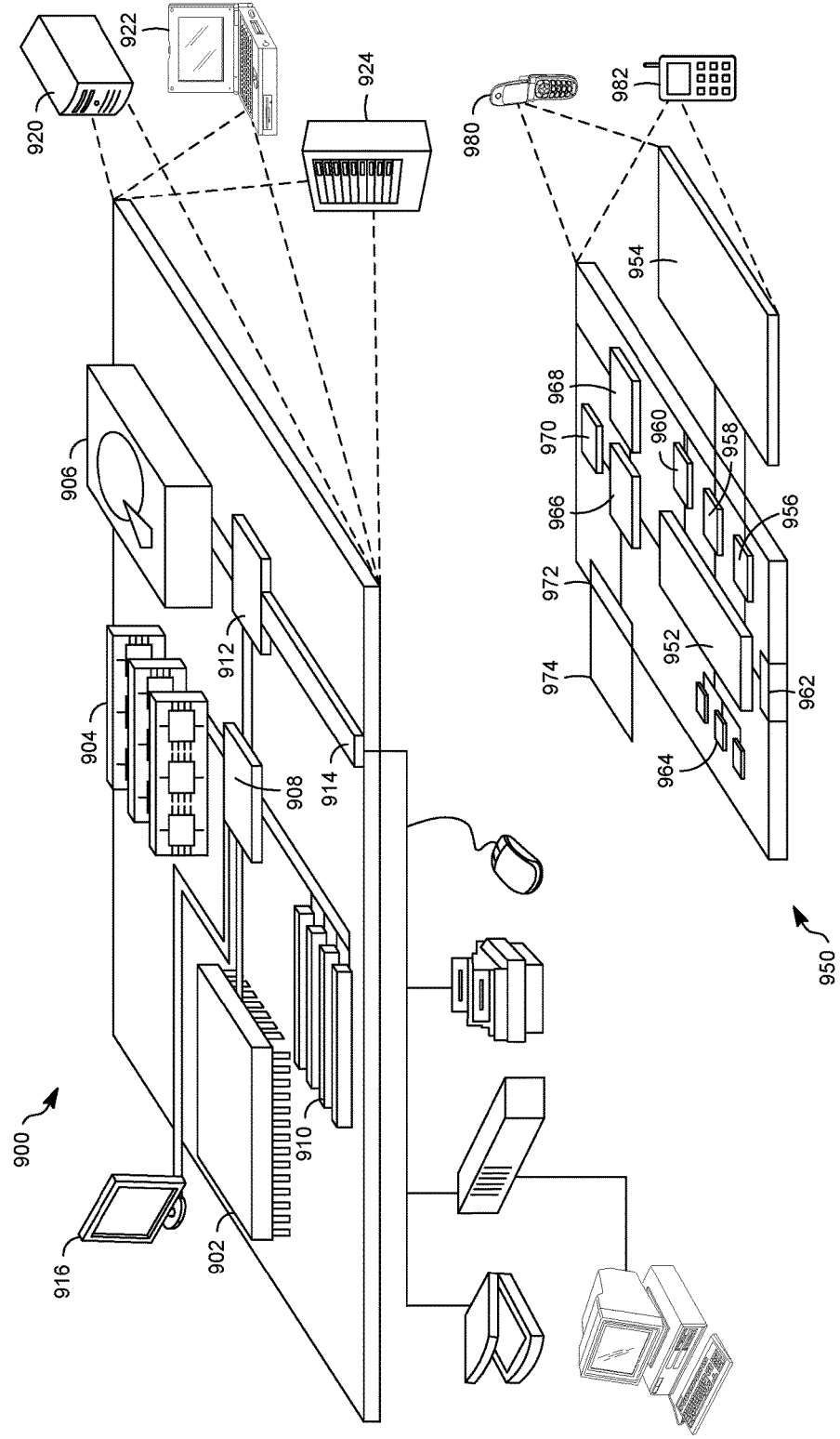
FIG. 9 shows an example of a generic computer device and a generic mobile computer device, which may be used with the techniques described here.

FIG. 9 shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A non-transitory computer-readable storage medium comprising instructions stored thereon for prompting a second user to activate a data saving feature based on a first user having activated the data saving feature, the instructions being configured to cause a portable computing device to at least:
   after logging the first user out, accept login credentials from the second user; and
   based on activating the data saving feature during a session associated with the first user, prompt the second user to activate the data saving feature during a session associated with the second user,
   wherein, before accepting the login credentials from the second user, the portable computing device:
   accepted login credentials from the first user;
   after accepting the login credentials from the first user, determined that the portable computing device was in a limited data environment;
   based on determining that the portable computing device was in the limited data environment, prompted the first user to activate the data saving feature;
   activated the data saving feature in response to input from the first user after the prompt during the session associated with the first user; and
   logged the first user out.

2. The non-transitory computer-readable storage medium of claim 1, wherein the data saving feature causes the portable computing device to receive compressed data from a proxy server and decompress the compressed data received from the proxy server.

3. The non-transitory computer-readable storage medium of claim 1, wherein the data saving feature comprises a browser extension configured to cause the portable computing device to receive compressed data from a proxy server and decompress the compressed data received from the proxy server.

4. The non-transitory computer-readable storage medium of claim 1, wherein:
the prompting the first user to activate the data saving feature includes prompting the first user to download a browser extension; and
the browser extension is configured to cause the portable computing device to receive compressed data from a proxy server and decompress the compressed data received from the proxy server.

5. The non-transitory computer-readable storage medium of claim 1, wherein the determining that the portable computing device was in the limited data environment was based on determining that a current data rate was lower than at least one previously measured data rate for a previously visited website.

6. The non-transitory computer-readable storage medium of claim 1, wherein the prompting the user to activate the data saving feature was based on determining that the portable computing device was in the limited data environment and determining that the data saving feature had not already been installed on the portable computing device.

7. The non-transitory computer-readable storage medium of claim 1, wherein the limited data environment includes a wireless network.

8. A method performed by a portable computing device, the method comprising:
after logging a first user out, accepting login credentials from a second user; and
based on activating a data saving feature during a session associated with the first user, prompting the second user to activate the data saving feature during a session associated with the second user,
wherein, before accepting the login credentials from the second user, the portable computing device:
accepted login credentials from the first user;
after accepting the login credentials from the first user, determined that the portable computing device was in a limited data environment;
based on determining that the portable computing device was in the limited data environment, prompted the first user to activate the data saving feature;
activated the data saving feature in response to input from the first user after the prompt during the session associated with the first user; and
logged the first user out.

9. The method of claim 8, wherein the data saving feature causes the portable computing device to receive compressed data from a proxy server and decompress the compressed data received from the proxy server.

10. The method of claim 8, wherein the data saving feature comprises a browser extension configured to cause the portable computing device to receive compressed data from a proxy server and decompress the compressed data received from the proxy server.

11. The method of claim 8, wherein:
the prompting the first user to activate the data saving feature includes prompting the first user to download a browser extension; and
the browser extension is configured to cause the portable computing device to receive compressed data from a proxy server and decompress the compressed data received from the proxy server.

12. The method of claim 8, wherein the determining that the portable computing device was in the limited data environment was based on determining that a current data rate was lower than at least one previously measured data rate for a previously visited web site.

13. The method of claim 8, wherein the prompting the user to activate the data saving feature was based on determining that the portable computing device was in the limited data environment and determining that the data saving feature had not already been installed on the portable computing device.

14. The method of claim 8, wherein the limited data environment includes a wireless network.

15. A portable computing device comprising:
at least one processor; and
a non-transitory computer-readable storage medium comprising instructions stored thereon for prompting a second user to activate a data saving feature based on a first user having activated the data saving feature, the instructions, when executed by the at least one processor, being configured to cause the portable computing device to at least:
after logging the first user out, accept login credentials from the second user; and
based on activating the data saving feature during a session associated with the first user, prompt the second user to activate the data saving feature during a session associated with the second user,
wherein, before accepting the login credentials from the second user, the portable computing device:
accepted login credentials from the first user;
after accepting the login credentials from the first user, determined that the portable computing device was in a limited data environment;
based on determining that the portable computing device was in the limited data environment, prompted the first user to activate the data saving feature;
activated the data saving feature in response to input from the first user after the prompt during the session associated with the first user; and
logged the first user out.

16. The portable computing device of claim 15, wherein the data saving feature causes the portable computing device to receive compressed data from a proxy server and decompress the compressed data received from the proxy server.

17. The portable computing device of claim 15, wherein the data saving feature comprises a browser extension configured to cause the portable computing device to receive compressed data from a proxy server and decompress the compressed data received from the proxy server.

18. The portable computing device of claim 15, wherein:
the prompting the first user to activate the data saving feature includes prompting the first user to download a browser extension; and
the browser extension is configured to cause the portable computing device to receive compressed data from a proxy server and decompress the compressed data received from the proxy server.

19. The portable computing device of claim 15, wherein the determining that the portable computing device was in the limited data environment was based on determining that a current data rate was lower than at least one previously measured data rate for a previously visited website.

20. The portable computing device of claim 15, wherein the prompting the user to activate the data saving feature was based on determining that the portable computing device was in the limited data environment and determining that the data saving feature had not already been installed on the portable computing device.

\* \* \* \* \*